United States Patent
Huang

(10) Patent No.: US 7,204,490 B2
(45) Date of Patent: Apr. 17, 2007

(54) SHAFT-SEALING DEVICE HAVING AN INNER MODULAR STRUCTURE FOR COMBINING WITH A ROTARY MACHINE

(75) Inventor: Cheng-Shiou Huang, Kaohsiung (TW)

(73) Assignee: Scenic Precise Element Inc., Kaohsiung (TW)

( * ) Notice: Subject to any disclaimer, the term of this patent is extended or adjusted under 35 U.S.C. 154(b) by 85 days.

(21) Appl. No.: 10/907,867

(22) Filed: Apr. 19, 2005

(65) Prior Publication Data
US 2006/0061041 A1   Mar. 23, 2006

(30) Foreign Application Priority Data
Sep. 22, 2004   (TW) ............... 93215157 U

(51) Int. Cl.
F16J 15/34   (2006.01)
(52) U.S. Cl. ............... 277/372; 277/373; 277/390
(58) Field of Classification Search ........ 277/370–373, 277/358, 395, 390
See application file for complete search history.

(56) References Cited
U.S. PATENT DOCUMENTS 3,025,070 A * 3/1962 Copes ............... 277/370
3,472,522 A * 10/1969 Winfrey ............... 277/352
3,655,206 A * 4/1972 Adams ............... 277/396
5,370,403 A * 12/1994 Sedy ............... 277/390
5,560,622 A * 10/1996 Sedy ............... 277/390

OTHER PUBLICATIONS

Taiwan Patent Publication No. 454,827, Sep. 11, 2001, 6 pages.
Taiwan Patent Publication No. 454,839, Sep. 11, 2001, 5 pages.
Taiwan Patent Publication No. 459,938, Oct. 11, 2001, 6 pages.

* cited by examiner

Primary Examiner—Vishal Patel
(74) Attorney, Agent, or Firm—Alan D. Kamrath; Nikolai & Mersereau, P.A.

(57) ABSTRACT

A shaft-sealing device includes a shaft tube, a retaining ring member, a rotary ring member, a resilient ring member and a sealing ring member. The shaft tube provides with an annular end flange and engaging notches thereon. The rotary ring member also provides with engaging recessions. Correspondingly, the retaining ring member provides with engaging teeth. In assembling, the resilient ring member is retained between the annular end flange of the shaft tube and the retaining ring member by the engaging teeth engaging with the engaging notches. The sealing ring member is disposed between the retaining ring member and the rotary ring member by the engaging teeth engaging with the engaging recessions. Consequently, the resilient ring member, the retaining ring member, the sealing ring member and the rotary ring member are successively mounted on the shaft tube in a longitudinal direction to constitute an inner modular structure.

4 Claims, 3 Drawing Sheets

SHAFT-SEALING DEVICE HAVING AN INNER MODULAR STRUCTURE FOR COMBINING WITH A ROTARY MACHINE

BACKGROUND OF THE INVENTION

1. Field of the Invention

The present invention relates to a shaft-sealing device having an inner modular structure for combining with a rotary machine. Particularly, the present invention relates to the shaft-sealing device having the inner modular structure for combining with the rotary machine mechanically connected to a pump system or the like. More particularly, the present invention relates to the shaft-sealing device having the inner modular structure to permit preassembling the shaft-sealing device so as to speed up installation time.

2. Description of the Related Art

In general, a conventional rotary machine such as a pump system includes a shaft sealing structure for sealing liquids such as cooling fluid. The shaft sealing structure consists of several parts. In assembling operation, each of the parts of the shaft sealing structure must be manually installed one by one within an inner space formed between a shaft hole and a rotary shaft. This practice necessitates a precise installation and unavoidably becomes disadvantageous particularly in case of imprecise installation. Furthermore, it is difficult and inconvenient to construct compactly the parts of the shaft sealing structure one by one between the shaft hole and the rotary shaft where an installation space is limited.

One type of conventional shaft-sealing device is disclosed in applicant own Taiwanese patent publication No. 454,827, entitled "SHAFT-SEALING DEVICE FOR A ROTARY MACHINE." TWN No. 454,827 discloses a shaft-sealing device including a shaft tube, a positioning sleeve, a first sealing ring unit, a main body, a second sealing ring unit and a fixed sleeve. Each of the first sealing ring units essentially consists of a rotary ring and a fixed ring. Sealing parts of the shaft-sealing device disclosed in TWN No. 454,827 are successively assembled on a rotary shaft to receive within a shaft hole.

Another type of conventional shaft-sealing device is disclosed in another applicant own Taiwanese patent publication No. 454,839, entitled "SHAFT-SEALING DEVICE FOR A ROTARY MACHINE (2)." TWN No. 454,839 also discloses a shaft-sealing device including a shaft tube, a positioning sleeve, a rotary ring, a fixed ring, a main body, a sealing ring unit and a fixed sleeve. Sealing parts of the shaft-sealing device disclosed in TWN No. 454,839 are successively assembled on a rotary shaft to receive within a shaft hole.

However, the rotary rings and the fixed rings of the shaft-sealing devices of TWN Nos. 454,827 and 454,839 are connected with each other by positioning pins within positioning holes that may complicate and increase manufacture cost. Since the structure of the positioning pins, in long-term use, may be weakened, the rotational movement of the shaft sealing device is not smooth, particularly, in high-speed rotation.

Another applicant own Taiwanese patent publication No. 459,938, entitled "SECTIONAL SHAFT-SEALING DEVICE FOR A ROTARY MACHINE USE," also discloses a shaft-sealing device. The shaft-sealing device includes a shaft tube, a first rotary ring unit, a first sealing ring unit, a main body, a second rotary ring unit and a second sealing ring unit. The shaft tube is securely connected with a rotary shaft of the rotary machine and rotated therewith. In assembling operation, the first rotary ring unit is securely mounted on and rotated with a first end of the shaft tube on which further providing with an annular end flange for retaining the first rotary ring unit. The first sealing ring unit is engaged with the first rotary ring unit, and also securely mounted on a predetermined position of the shaft tube which is proximate to a shaft hole of the rotary machine. The main body such as an outer lid is securely connected with the rotary machine, and used to engage with the first sealing ring unit. The main body includes an annular wall essentially delimiting an inner assembling space. The second rotary ring unit is securely mounted on a second end of the shaft tube beyond the rotary machine, and received in the inner space of the main body. The second sealing ring unit is securely mounted on a predetermined position of the shaft tube beyond the annular end flange of the main body, and disposed outside the main body.

The parts of the shaft-sealing device disclosed in TWN No. 459,938 must be assembled and examined in a leakage test prior to installing the shaft-sealing device on the rotary machine. The shaft-sealing device can be applied to the rotary machine if no leakage of cooling fluid occurs in a test. The leakage test can consequently avoid a disassembling or reassembling operation for the shaft-sealing device after installing on the rotary machine if leakage of cooling fluid occurs in use. Although the positioning member connected the end of the shaft tube with the first rotary ring of No. 459938 may increase intensity of the entire structure, it still complicates the entire structure and increases manufacture cost.

The present invention intends to provide a shaft-sealing device having an inner modular structure to permit preassembling the shaft-sealing device so as to speed up installation time in such a way to mitigate and overcome the above problem.

SUMMARY OF THE INVENTION

The primary objective of this invention is to provide a shaft-sealing device having an inner modular structure for combining with a rotary machine, wherein the inner modular structure can be prefabricated and simplified for easy installation.

The secondary objective of this invention is to provide the shaft-sealing device having the inner modular structure, wherein the inner modular structure permits installing the shaft-sealing device on the rotary machine in one-step so as to speed up installation time.

The shaft-sealing device in accordance with the present invention includes a shaft tube, a retaining ring member, a rotary ring member, a resilient ring member and a sealing ring member. The shaft tube provides with a first end having an annular end flange on which forming a plurality of engaging notches. The rotary ring member also provides with a plurality of engaging recessions. Correspondingly, the retaining ring member provides with first engaging teeth and second engaging teeth oppositely extended therefrom in a longitudinal direction. In assembling, the resilient ring member is retained between the annular end flange of the shaft tube and the retaining ring member by the first engaging teeth of the retaining ring member engaging with the engaging notches of the annular end flange. The sealing ring member is disposed between the retaining ring member and the rotary ring member by the second engaging teeth of the retaining ring member engaging with the engaging recessions of the rotary ring member. Consequently, the resilient ring member, the retaining ring member, the sealing ring member and the rotary ring member are successively mounted on the shaft tube in a longitudinal direction to constitute an inner modular structure.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
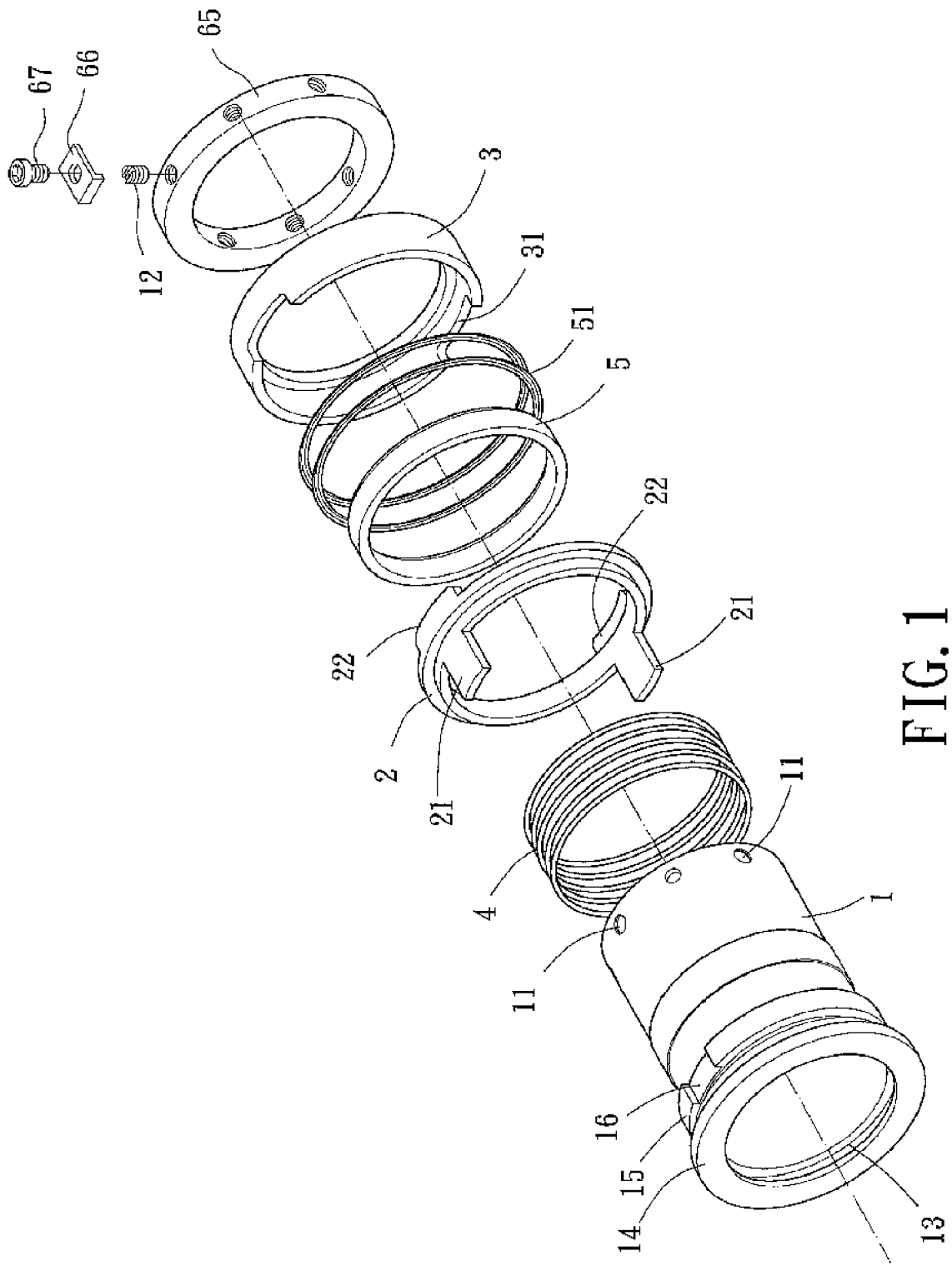
FIG. 1 is an exploded perspective view of a shaft-sealing device having an inner modular structure to constitute a fixed sealing unit for combining with a rotary machine in accordance with a preferred embodiment of the present invention.
Figure 2:
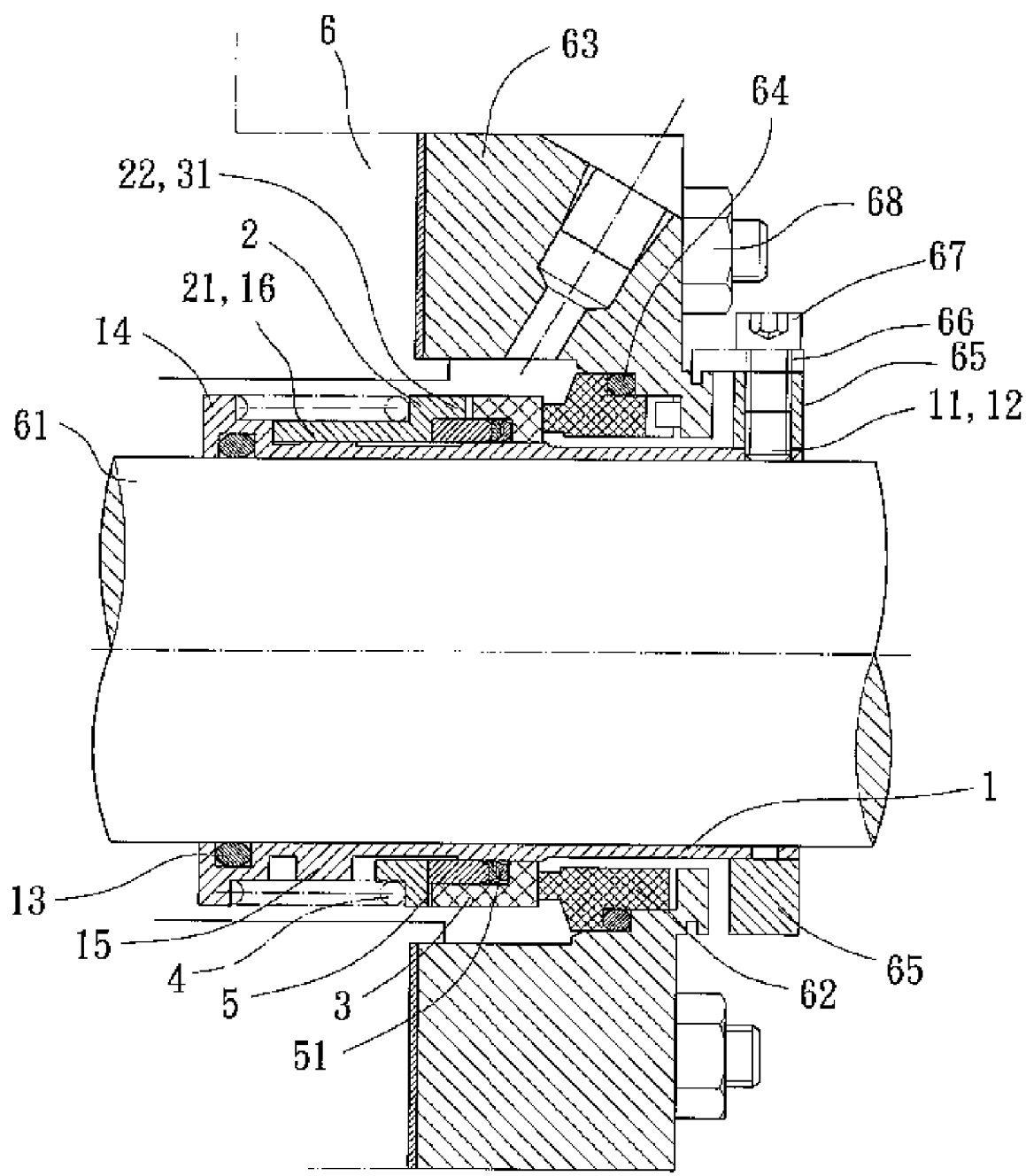
FIG. 2 is a cross-sectional view of the shaft-sealing device combined with the rotary machine, in installing operation, in accordance with the preferred embodiment of the present invention.

Referring initially to FIGS. 1 and 2, a shaft-sealing device having an inner modular structure in accordance with the preferred embodiment of the present invention mainly includes a shaft tube 1, a retaining ring member 2, a rotary ring member 3, a resilient ring member 4 and a sealing ring member 5. In the illustrated embodiment, the shaft-sealing device is installed on a rotary machine 6 which may mechanically connected to a pump system (not shown) or the like. Although some parts of the rotary machine 6 are shown, it will be appreciated that the rotary machine 6 includes a known structure such as a motor.

Still referring to FIG. 2, the shaft tube 1 is co-axially connected with a rotary shaft 61 of the rotary machine 6 and rotated therewith. The resilient ring member 4, the retaining ring member 2, the sealing ring member 5 and the rotary ring member 3 are successively mounted on the shaft tube 1 in a longitudinal direction to constitute an inner modular structure as well as a fixed sealing unit.

The construction of the shaft tube 1 shall be described in detail, referring again to FIGS. 1 and 2. In the preferred embodiment, the shaft tube 1 is a tubular member having a first end and a second end connected thereto. The rotary shaft 61 of the rotary machine 6 is able to extend through a longitudinal hole of the shaft tube 1, and fittingly fixed therein. A gasket ring 13 is sandwiched in-between an inner circumference of the shaft tube 1 and the rotary shaft 61. The first end of the shaft tube 1 provides with an end face 14, and further provides with an annular end flange 15 on which forming a plurality of engaging notches 16. Preferably, the annular end flange 15 includes one or two pairs of the engaging notches 16. By use such an arrangement of the engaging notches 16, the annular end flange 15 of the shaft tube 1 can engage with the retaining ring member 2. The second end of the shaft tube 1 is further mechanically connected with a stop ring 65 for limiting an axial movement of the shaft tube 1. A series of screw holes 11 are equi-spaced around the second end of the shaft tube 1. Screw members 12 such as fixing members are screw-connected with the screw holes 11 to mount the shaft tube 1 on the rotary shaft 61 of the rotary machine 6, as best shown in FIGS. 1 and 2. Also, a fixing screw 67 may be received in one of the screw holes 11 to mount an auxiliary positioning hook 66 on the stop ring 65 such that the combination of the shaft tube 1 with the stop ring 65 is mounted to a main body 63 of the rotary machine 6 by the auxiliary positioning hook 66.

The construction of the retaining ring member 2 shall further be described in detail, still referring to FIGS. 1 and 2. In the preferred embodiment, the retaining ring member 2 provides with first engaging teeth 21 and second engaging teeth 22 oppositely extended therefrom in a longitudinal direction. Preferably, the retaining ring member 2 includes one or two pairs of the first engaging teeth 21. In assembling, the first engaging teeth 21 of the retaining ring member 2 are extended into and engaged with the engaging notches 16 of the annular end flange 15 such that the retaining ring member 2 is combined with the annular end flange 15 of the shaft tube 1. Consequently, the second engaging teeth 22 of the retaining ring member 2 may be used to engage with the rotary ring member 3 in addition to the engagement of the first engaging teeth 21 with the engaging notches 16 of the shaft tube 1.

The construction of the rotary ring member 3 shall further be described in detail, still referring to FIGS. 1 and 2. In the preferred embodiment, the rotary ring member 3 provides with a plurality of engaging recessions 31 corresponding to the second engaging teeth 22 of the retaining ring member 2. In assembling operation, the second engaging teeth 22 of the retaining ring member 2 are correspondingly extended into and engaged with the engaging recessions 31 of the rotary ring member 3 such that the retaining ring member 2 is combined with the rotary ring member 3.

The construction of the resilient ring member 4 shall further be described in detail, still referring to FIGS. 1 and 2. In the preferred embodiment, disposed between the annular end flange 15 of the shaft tube 1 and the retaining ring member 2 is the resilient ring member 4 which can be selected from a ring spring. In the preferred embodiment, the resilient ring member 4 is designed for having a high degree of flexibility in force characteristics, and can be relatively rigid and strong to withstand normal usage of the rotary machine 6. In assembling operation, a first end of the resilient ring member 4 abuts against the annular end flange 15 of the shaft tube 1 while the second end of the resilient ring member 4 abuts against the retaining ring member 2. When compressed, a bias force of the resilient ring member 4 is applied to the retaining ring member 2 such that the retaining ring member 2 is closely engaged with the rotary ring member 3. Consequently, engagements of the second engaging teeth 22 of the retaining ring member 2 with the engaging recessions 31 of the rotary ring member 3 are insured.

The construction of the sealing ring member 5 shall further be described in detail, still referring to FIGS. 1 and 2. In the preferred embodiment, received between the retaining ring member 2 and the rotary ring member 3 is the sealing ring member 5. Preferably, the sealing ring member 5 is configured as an O-shaped ring or a plastic ring. In the preferred embodiment, the sealing ring member 5 further includes a pair of roughly V-shaped or U-shaped sealing gaskets 51 for use in maintaining a preferred sealing effect between the retaining ring member 2 and the rotary ring member 3 in the intended manner.

The construction of the main body 63 of the rotary machine 6 shall further be described in detail, still referring to FIGS. 1 and 2. Conventionally, the main body 63 may serve to maintain an assembled relationship of the shaft-sealing device and the rotary machine 6. The main body 63 has an axial hole (not labeled) for supporting the shaft tube 1 which is rotatably extended therethrough, and a plurality of passages (not labeled) connected an outer peripheral surface with the axial hole for supplying and cycling fluid therefrom.

Referring again to FIG. 2, the resilient ring member 4, the retaining ring member 2, the sealing ring member 5, the roughly V-shaped sealing gaskets 51 and the rotary ring member 3 are successively assembled on the shaft tube 1 to constitute the fixed sealing unit, and a positioning ring 62 is further mounted on the shaft tube 1 in the event the fixed sealing unit of the shaft-sealing device is engaged with the positioning ring 62. Under the circumstances the rotary ring member 3 of the fixed sealing unit is closely engaged with the positioning ring 62 by exerting a bias force of the resilient ring member 4. To reduce operating temperature of the fixed sealing unit it is preferable to manufacture the rotary ring member 3 and the positioning ring 62 to have as low friction characteristic as possible. In addition, the shaft-sealing device and the positioning ring 62 are received in the axial hole of the main body 63 so that the shaft-sealing device and the main body 63 are preassembled in preparing the shaft-sealing device for installation. Preferably, the rotary ring member 3 and the positioning ring 62 are constructed from a material selected from ceramics or tungsten carbide which has a high degree of hardness to withstand constant friction in rotational movement. A gasket ring 64 is further disposed between the positioning ring 62 and the main body 63 for sealing purpose.

Still referring to FIG. 2, in installation, the rotary shaft 61 of the rotary machine 6 passes through the shaft tube 1, and the screw members 12 screw-connected with the screw holes 11 mounts the shaft tube 1 on the rotary shaft 61 such that the shaft tube 1 is rotated with the rotary shaft 61 of the rotary machine 6. During installation, positioned between the main body 63 and the stop ring 65 is the auxiliary positioning hook 66. The fixing screw 67 received in one of the screw holes 11 is further used to mount the auxiliary positioning hook 66 on the stop ring 65. It will be appreciated that the auxiliary positioning hook 66 serves to maintain a spaced relationship between the main body 63 and the stop ring 65 prior to installing the shaft-sealing device on the rotary machine 6. By preassembling the inner parts of the shaft-sealing device, the installation of the shaft-sealing device on the rotary machine 6 may be carried out in a one-step operation so as to speed up installation time. After fitting the shaft-sealing device on the rotary shaft 61, the main body 63 is mounted to the rotary machine 6 by means of a securing means such as a fixing screw 67.

Figure 3:
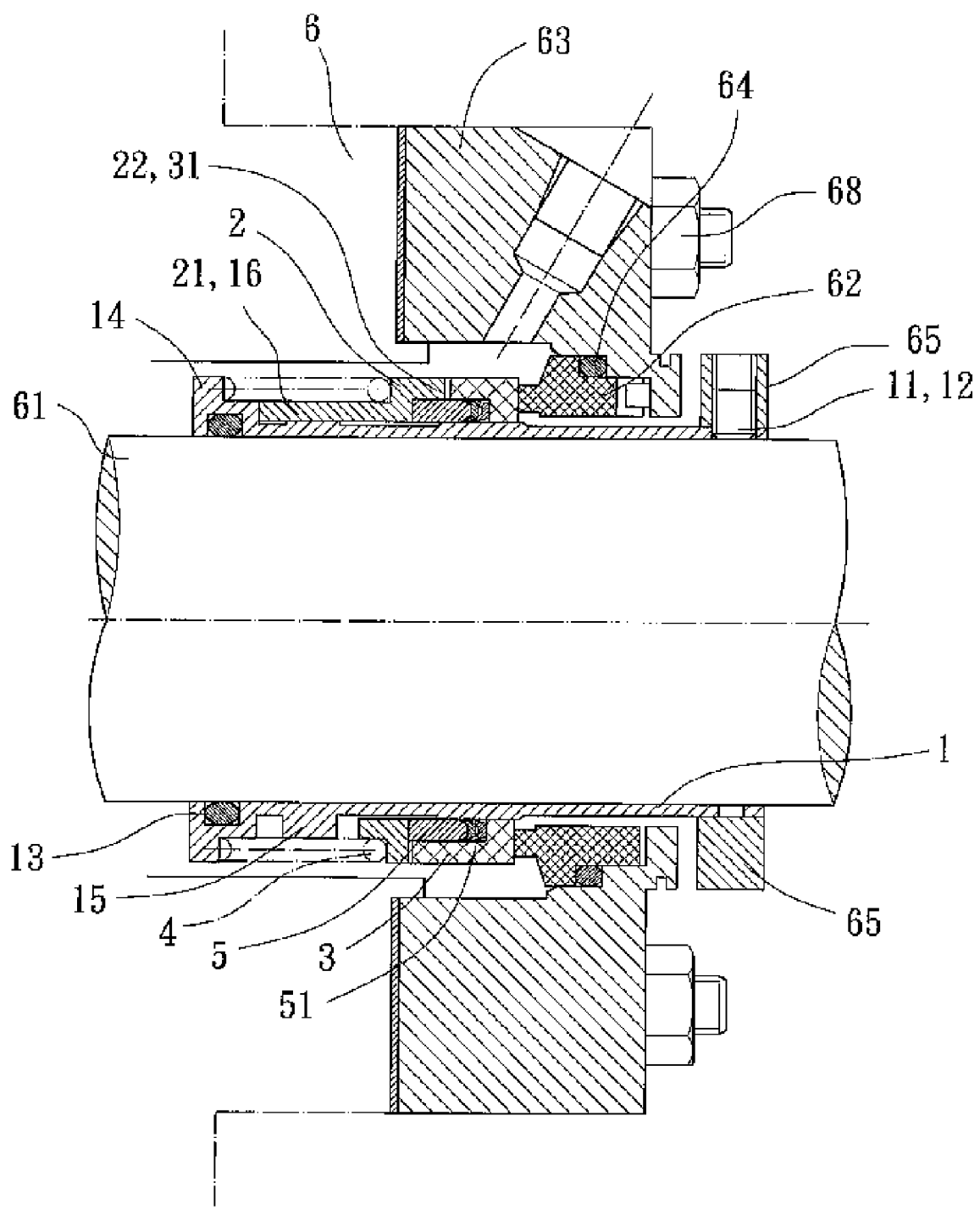
FIG. 3 is a cross-sectional view, similar to FIG. 2, of the shaft-sealing device combined with the rotary machine, after installing, in accordance with the preferred embodiment of the present invention.

Turning now to FIG. 3, once the shaft-sealing device is secured on the rotary machine 6, the fixing screw 67 is loosened to permit removing the auxiliary positioning hook 66 from the stop ring 65. Once removed, the main body 63 combined with the rotary machine 6 and the stop ring 65 mounted on the rotary shaft 61 are maintained in spaced relationship for allowing rotational movement. Consequently, the installation of the shaft-sealing device on the rotary machine 6 is accomplished.

Furthermore, in case of a leak hunting is required, the inner modular structure of the shaft tube 1, the resilient ring member 4, the retaining ring member 2, the sealing ring member 5 and the rotary ring member 3 can be preassembled and pretested outside of the rotary machine 6. If the leak hunting is passed, the inner modular structure of the shaft tube 1, the resilient ring member 4, the retaining ring member 2, the sealing ring member 5 and the rotary ring member 3 be directly installed into the main body 63 in one-step operation. If the leak hunting is failed, the resilient ring member 4, the retaining ring member 2, the sealing ring member 5 and the rotary ring member 3 must be reexamined and reassembled on the shaft tube 1 without repeatedly detaching the shaft-sealing device from the rotary machine 6.

In consideration of easy manufacturing the shaft-sealing device, the inner modular structure of the shaft tube 1 is provided. The configurations of the resilient ring member 4, the retaining ring member 2, the sealing ring member 5 and the rotary ring member 3 are simplified to thereby arrange within a limited installation space of the main body 63 of the rotary machine 6. To prevent from leakage, the resilient ring member 4 serves to exert a bias force from the annular end flange 15 of the shaft tube 1 to the retaining member 2, the sealing ring member 5 and the rotary ring member 3 such that the rotary ring member 3 of the shaft-sealing device closely engages with the positioning ring 62 of the rotary machine 6.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A shaft-sealing device having an inner modular structure comprising:

a shaft tube having a first end on which provided with an annular end flange and at least one engaging notch thereof, and a second end connecting with the first end;

a retaining ring member arranged on the shaft tube, the retaining member provided with at least one first engaging tooth and at least one second engaging tooth oppositely extended therefrom in a longitudinal direction, and the first engaging tooth engaged with the engaging notch of the shaft tube;

a rotary ring member arranged on the shaft tube, the rotary ring member provided with at least one engaging recession engaged with the second tooth of the retaining ring member;

a resilient ring member arranged on the shaft tube, and disposed between the annular end flange of the shaft tube and the retaining ring, the resilient ring member having a first end abutting against the annular end flange of the shaft tube, and a second end further abutting against the retaining ring; and at least one sealing gasket arranged on the shaft tube, and disposed between the retaining ring and the rotary ring member;

wherein the resilient ring member, the retaining ring member, the sealing gasket and the rotary ring member is successively assembled on the shaft tube in a longitudinal direction to constitute the inner modular structure for combining with a rotary machine;

wherein the shaft-sealing device has a main body connected to a rotary machine, and a positioning ring received in the main body;

wherein the shaft tube is mounted to a rotary shaft of the rotary machine by fixing members;

wherein the second end of the shaft tube includes a plurality of screw boles to receive the fixing members such that the fixing member securely mounts the shaft tube on the rotary shaft of the rotary machine;

wherein a stop ring mounts the shaft tube to the rotary shaft of the rotary machine;

wherein an auxiliary positioning hook connects between the main body of the rotary machine and the stop ring, thereby the auxiliary positioning hook which serves to maintain a spaced relationship between the main body and the stop ring prior to installation; after installing the shaft-sealing device, removing the auxiliary positioning hook from the stop ring.

2. The shaft-sealing device having the inner modular structure as defined in claim 1, wherein an inner circumference of the shaft tube includes a gasket ring to confront with a rotary shaft.

3. The shaft-sealing device having the inner modular structure as defined in claim 1, wherein a sealing ring member is disposed between the retaining ring member and the sealing gasket.

4. The shaft-sealing device having the inner modular structure as defined in claim 1, wherein a gasket ring is disposed between the main body and the positioning ring.

* * * * *